May 21, 1946.   F. LAMBACH ET AL   2,400,556
STOP CONTROL MEANS FOR STOP MOTIONS FOR WARPING OR BEAMING PLANTS
Filed Feb. 1, 1944   7 Sheets-Sheet 3

INVENTORS
Fritz LAMBACH and
Walter SIEGEL
BY
Attorney.

May 21, 1946.  F. LAMBACH ET AL  2,400,556
STOP CONTROL MEANS FOR STOP MOTIONS FOR WARPING OR BEAMING PLANTS
Filed Feb. 1, 1944  7 Sheets-Sheet 4

INVENTORS
Fritz LAMBACH and
Walter SIEGEL
BY
Attorney.

May 21, 1946. F. LAMBACH ET AL 2,400,556
STOP CONTROL MEANS FOR STOP MOTIONS FOR WARPING OR BEAMING PLANTS
Filed Feb. 1, 1944 7 Sheets-Sheet 6

INVENTORS
FRITZ LAMBACH
WALTER SIEGEL
BY
ATTORNEY

Patented May 21, 1946

2,400,556

UNITED STATES PATENT OFFICE 2,400,556

STOP CONTROL MEANS FOR STOP MOTIONS FOR WARPING OR BEAMING PLANTS

Fritz Lambach, Tenafly, and Walter Siegel, Union City, N. J., assignors to Robert Reiner, Inc., Weehawken, N. J.

Application February 1, 1944, Serial No. 520,598

21 Claims. (Cl. 28—51)

This is a continuation-in-part of patent application Serial #486,524, filed May 11, 1943.

Our invention relates to textile machines, and more particularly to stop control means for an electrically operated stop motion for a warping or beaming plant.

An object of our invention is to improve upon stop control means for stop motions for warping or beaming plants as now ordinarily made.

Another object of our invention is to provide a stop control means or a so-called drop needle or control needle the operation of which cannot be affected by the presence of dust or lint.

A further object of our invention is to provide a stop motion with a plurality of rows of drop needles, wherein each drop needle may be individually exchanged without removing the remaining drop needles of the same row from the arm carrying the drop needles.

Still another object of our invention is to provide an arrangement of drop needles for a stop motion, which permits an easy threading of the drop needles without the use of a conventional threading hook.

Our invention consists in certain novel features of an electrically operated stop motion as will be fully described hereinafter.

Further objects and advantages of the invention will be apparent from the following disclosure of several embodiments thereof.

In the accompanying drawings is:

Fig. 10 an elevational view of the mercury switch shown in Fig. 9, said mercury switch, however, being in its "on-position" upon breakage of a warp yarn, Fig. 11 a fragmentary top plan view of a different embodiment of an arm of a frame carrying a different embodiment of control needles with mercury switches, Fig. 12 a vertical sectional view of the stop control means shown in Fig. 11, taken on line 12—12 of Fig. 11, Fig. 13 a fragmentary top plan view of an arm of a frame carrying a further embodiment of control needles with mercury switches, Fig. 14 a vertical sectional view of the stop control means shown in Fig. 13, taken on line 14—14 of Fig. 13, Fig. 15 a vertical sectional view of an arm of a frame carrying a further embodiment of control needles with mercury switches, Fig. 16 a horizontal sectional view of the stop control means shown in Fig. 15, taken on line 16—16 of Fig. 15, Fig. 17 a fragmentary vertical sectional view of the stop control means shown in Fig. 15, similar to that shown in said Fig. 15, wherein, however, the control needle is immobilized by a locking element, Fig. 18 an elevational view of an arm of a frame carrying control needles of the type shown in Figs. 15–17, said arm being equipped with a mechanism for lifting the control needles into a threading position.

Figure 1:
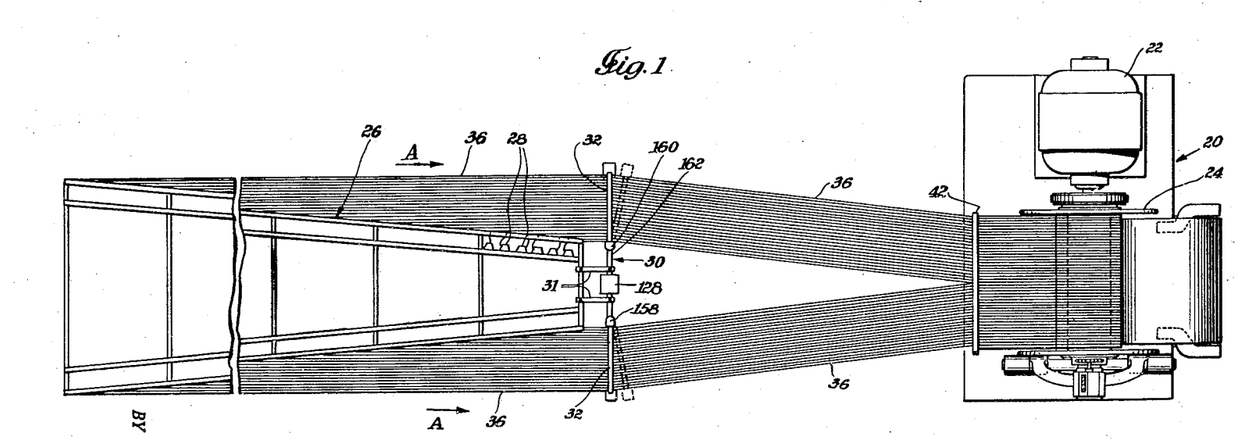
Fig. 1 a more or less diagrammatical top plan view of a warping plant comprising a creel, a frame for the support of the control needles of an electrically operated stop motion, and a warper, Fig. 2 a diagrammatical illustration of the change in the angles between the oncoming end and leaving end of a warp yarn and an adjustable arm of the frame carrying the control needles by a change in the position of the arm, Fig. 3 an elevational view of the frame for the support of the control needles, in a somewhat diagrammatical manner, Fig. 4 in an enlarged scale, a sectional view of the frame taken on line 4—4 of Fig. 3, illustrating some details of an arm of the frame, Fig. 5 an elevational view of the arm of the frame shown in Fig. 4, Fig. 6 in an enlarged scale, a fragmentary sectional view of an arm of the frame taken on line 6—6 of Fig. 5, Fig. 7 a fragmentary sectional view of an arm similar to that shown in Fig. 6, wherein, however, the control needle including a mercury switch is in the circuit closing position upon breakage of a warp yarn, Fig. 8 a fragmentary sectional view of an arm with the supporting members carrying the mercury switches of the control needles, taken on line 8—8 of Fig. 6, Fig. 9 an elevational view of a mercury switch of a control needle according to the embodiment shown in Figs. 6–8, said mercury switch being in its "off-position,"

Referring now to Fig. 1, 20 generally indicates a warper having a motor 22 for driving a beam 24. 26 generally indicates a creel carrying a plurality of bobbins 28, only a portion of said bobbins being shown in the drawings. 30 generally indicates a frame connected to the creel by two connecting bars 31 and equipped with a plurality of arms 32 carrying rows of control needles or drop needles not shown in Fig. 1. The control needles or drop needles are diagrammatically indicated by 34 in Fig. 3, according to which one row of such needles is arranged on each of the twenty arms 32a, 32b, 32c, . . . 32t of the frame 30. The construction and arrangement of the control needles will be described hereinafter in detail in connection with Figs. 4–10.

Figure 6:
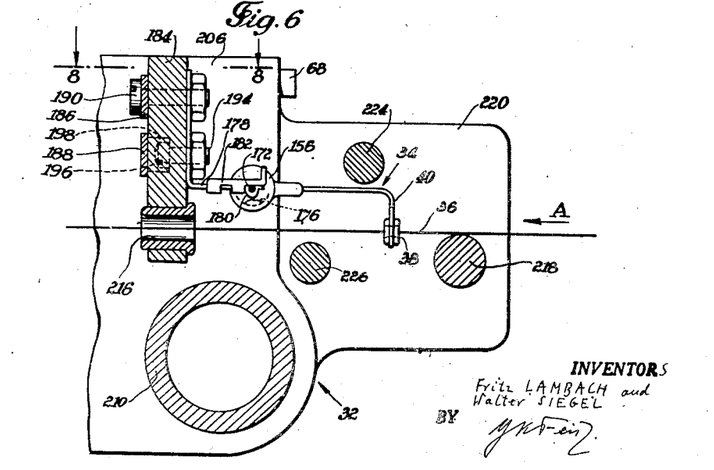

During the normal operation of the warping or beaming plant, the warp yarns 36 travel from the bobbins 28 in the direction of the arrow A through eyelets 38 of control fingers 40 of the control needles 34 and through a reed 42 of the warper 20 to the beam 24 upon which they are being wound. Under these circumstances, the control needles 34 are in their inactive operating position as shown in Fig. 6.

Figure 7:
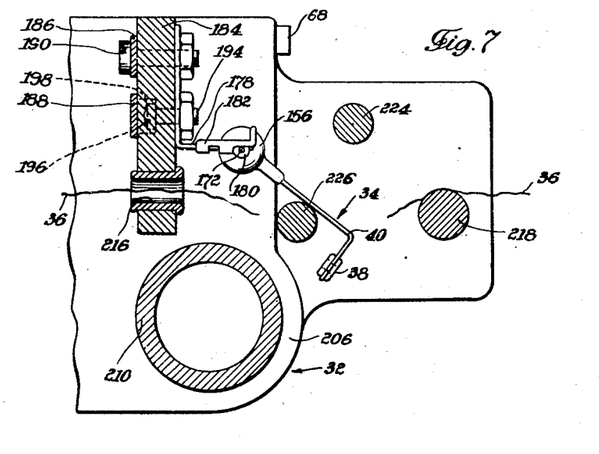

In case of warp yarn failure, such as a warp yarn breakage, however, the control needle or control needles 34 cooperating with such broken warp yarn or warp yarns drop into the active controlling position or "on-position" as shown in Fig. 7. This "on-position" of a control needle 34 serves to close a needle control circuit of an electrically operated stop motion, whereby, in a manner known per se, the stop motion is actuated for a stoppage of the motor 22 of the warper 20.

According to the embodiment shown in Figs. 1–10, the control needles 34 comprising mercury switches 156 are arranged on adjustable arms 32 of the frame 30. The frame may be readily attached to various types of creels and may be readily adjusted to the requirements of the respective creel.

Figure 3:
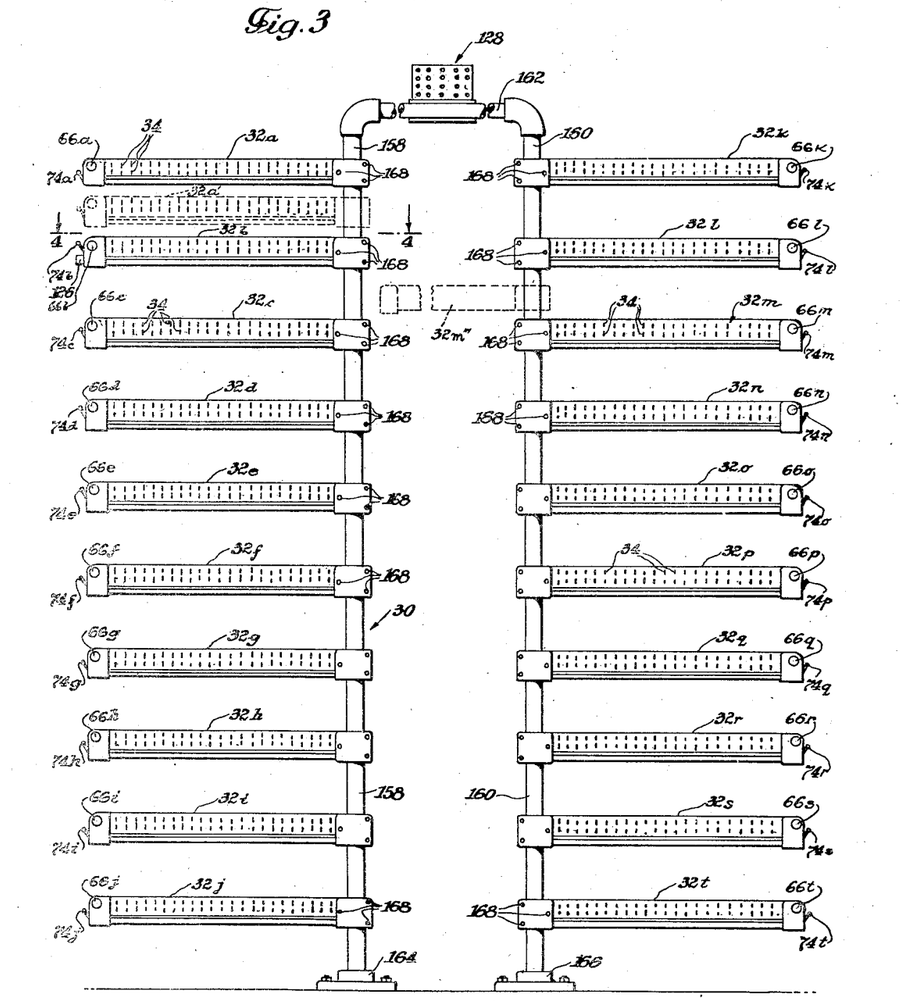

As best shown in Fig. 3, the frame 30 comprises a stand including two uprights 158, 160 spaced from each other at a suitable distance, corresponding to the measurements of the creel, and connected with each other by a rod 162, or the like. The uprights 158, 160 are mounted in bases 164, 166, which may be screwed to the ground. According to Fig. 1, the frame 30 may be connected with the creel by the members 31. Of course, the frame may be connected with the creel in any different way, if desired. If the stop motion is equipped with an annunciator, such an annunciator 128 may be mounted on the connecting rod 162.

Each upright 158, 160 carries a plurality of arms 32 for the support of the control needles 34. In the embodiment shown in Fig. 3, the upright 158 carries ten arms 32a to 32j, and the upright 160 carries ten arms 32k to 32t. Each arm 32a, 32b, 32c, . . . 32t carries a row of control needles 34, the control needles of each row being electrically connected with each other in parallel. Furthermore, each arm 32a, 32b, 32c, . . . 32t carries a manual circuit closing switch 74a, 74b, 74c, . . . 74t and a control lamp 66a, 66b, 66c, . . . 66t, both electrically connected in series with the row of control needles on the respective arm. In the embodiment shown in Fig. 3, a manual auxiliary stop switch 126 electrically connected in parallel with the control needles 34 on the second arm 32b on the left hand side of the frame for a manual stopping of the warping or beaming plant is mounted on said arm 32b.

Each arm 32a, 32b, 32c, . . . 32t is slidably and swingably mounted on the uprights 158 and 160 and may be held in its adjusted position by screws 168 or the like.

Fig. 3 illustrates the adjustments of one of the arms, the arm 32a, in vertical direction by sliding same in the direction of the longitudinal axis of the upright 158 from the position 32a into the position 32a'. Of course, all of the remaining arms 32b, 32c, 32d, . . . 32t may be adjusted in the same manner for bringing the rows of control needles in a suitable plane with respect to the arrangement of the bobbins in the creel.

Figure 2:
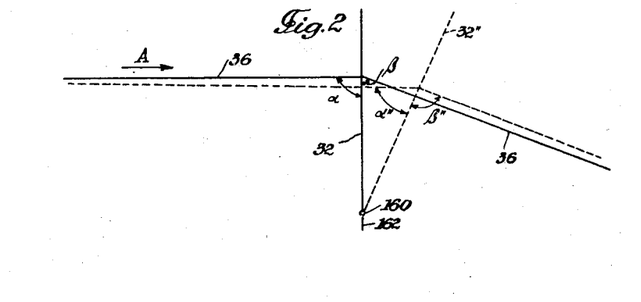

Figs. 1 and 2 illustrate the adjustment of the arms 32 of the frame 30 by swinging same to a certain degree around the upright 158 or 160. If, for example, an arm 32 is in the position shown in full lines in Figs. 1 and 2, a warp yarn 36 travels as shown by full lines in Fig. 2. Under these conditions the angle α between the oncoming end of the warp yarn 36 and the arm 32 is considerably larger than the angle β between the leaving end of the warp yarn 36 and the arm 32. If the arm 32 is swung into the position 32" shown in dash lines, the angle α is reduced to the angle α" and the angle β is enlarged to the angle β", so that it is possible to obtain practically equal angles, whereby a smoother running of the warp yarns is assured.

In the embodiment shown in Fig. 1 the bobbins 28 are arranged on the inside of the creel; there are, however, creels on the market wherein the bobbins are arranged on the outside, and the warp yarns leave the creel substantially in the middle thereof. The frame 30 shown in Figs. 1–3 may be readily adapted to such type of creels by swinging the arms through the angle of about 180°, as shown in connection with the arm 32m, which, for example, may be turned into the position 32m'''.

If desired, the connecting rod 162 of the frame 30 may be either exchangeable or adjustable so that the distance between the uprights 158 and 160 may be changed in accordance with the measurements of the creel for which the frame is to be used.

As will be apparent from above description of the frame 30, the adjustable construction of the frame permits the use of the frame with creels of any type and measurement, so that, if desired, the same frame may be used for several creels of different types.

The frame described above must not necessarily be arranged at the creel. If desired, the frame carrying the control needles may be arranged at any suitable place, for example, at the warping or beaming machine or at a place between the creel and warping or beaming machine.

According to the embodiment shown in Figs. 4–10, each control needle or drop needle 34 mounted on the arms 32 of the frame 30 comprises a control finger 40 rigidly secured to the wall of the closed casing of a mercury switch 156. In the preferred embodiment shown in said Figs. 4–10 the metallic control finger 40 is fused with the glass wall of the casing of the mercury switch 156. The wire forming the control finger 40 is bent in a suitable manner so as to form a projecting end comprising a loop for receiving an eyelet 38 of porcelain or the like. The eyelet 38 forms a passage for the warp yarn 36.

Figure 8:
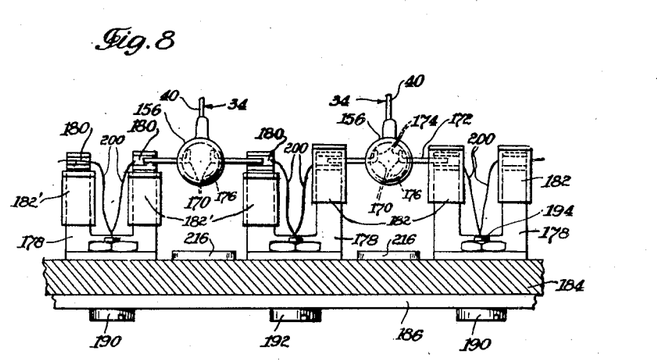
Figures 9, 10:
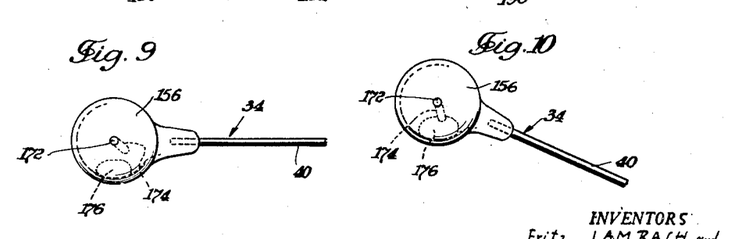

According to Fig. 8, wires generally indicated by 170 are fused with the glass wall of the casing of the mercury switch 156 so that they are rigidly connected therewith. The end 172 of said wires 170 projecting from the outside of the casing of the mercury switch form the pivots of the mercury switch. The inner ends 174 of said wires 170 are bent in a suitable manner so that they may form the contact elements or contact means of the mercury switch. If, during the normal operation of the warping plant, the mercury switch 156 is in its "off-position" as shown in Figs. 6 and 9, the contact elements or contact means 174 are at a suitable distance from the mercury 176 enclosed in the casing of the mercury switch 156, so that the circuit including the mercury switch is interrupted. If, however, owing to a breakage of warp yarn, the mercury switch 156 is swung into the "on-position" shown in Figs. 7 and 10, the ends of the contact elements or contact means 174 immerse in the mercury 176 for closing the circuit including the mercury switch. As will be apparent from above description, the pivots 172 of each mercury switch 156 are electrically connected with the contact elements or contact means 174; in the described embodiment the pivots are integral with the contact elements or contact means, but any other electrical connection between the pivots and the contact elements or contact means of the mercury switches may be chosen, if desired. In view of the fact, that the contact elements or contact means 174 are arranged within the closed casing of the mercury switch 156, an accumulation of dust or lint on said contact elements or contact means is entirely eliminated, so that a perfect operation of the stop control means is assured.

As best shown in Figs. 4, 6, 7 and 8, the row of control needles 34 comprising the control fingers 40 connected with the mercury switches 156 is mounted on a row of spaced supporting members 178. Each mercury switch is swingably arranged on two successive supporting members 178 by its pivots 172 resting on suitable bearings 180 of the supporting members. The pivots 172 are held in the bearings 180 by shiftable slides 182. If it is desired to insert a control needle 34 into its place, or to exchange a control needle 34, the slides are moved into the position 182', as shown in Fig. 8, whereby the bearing 180 becomes accessible.

Figure 5:
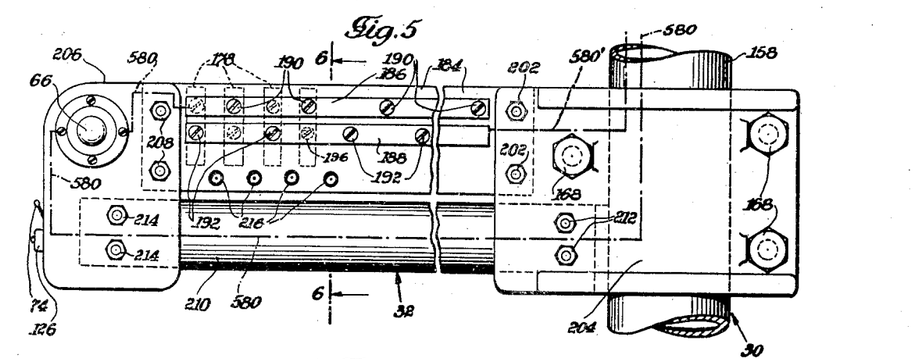

As pointed out above, the pivots 172 of the mercury switches are electrically connected with the contact elements 174. Accordingly, one of said pivots must be electrically connected with one terminal of the electric source, and the other pivot must be electrically connected with the other terminal of the electric source. In order to obtain this feature, we make the following arrangement:

The supporting members 178 are made of a conducting material, for example, of metal. These metallic supporting members 178 are mounted on one side of a supporting bar 184 made of a non-conducting material. Two bus-bars 186 and 188 are arranged on the other side of said supporting bar 184. As best shown in Fig. 5, the bus-bar 186 is electrically connected with a first feeding line 580 of the needle control circuit diagrammatically shown in dash and dot lines; said first feeding line 580 including the creel lamp 66 is electrically connected with one terminal of an electric source (not shown). Furthermore, the bus-bar 188 is electrically connected with a second feeding line 580' of the needle control circuit, which, in turn, is electrically connected with the second terminal of the electric source (not shown). Moreover, according to Figs. 5–8, a first series of alternate supporting members 178 is electrically connected with the first bus-bar 186 by screws 190 of conducting material, while a second series of alternate supporting members 178 is electrically connected with the second bus-bar 188 by screws 192 of conducting material. As best shown in Figs. 6 and 7, each supporting member 178 is secured to the supporting bar 184 by two screws, only one of said two screws being electrically connected with a bus-bar; if, for example, the screw 190 is electrically connected with the bus-bar 186 by its head resting on the surface of the bus-bar, the other screw 194 is not electrically connected with the bus-bar 188, as the head 196 rests on the shoulder of a recess 198 arranged in the non-conducting supporting bar 184. As will be apparent from above description, a first series of alternate supporting member 178 is electrically connected with the first feeding line 580, and a second series of alternate supporting members 178 is electrically connected with the second feeding line 580'. Thus, as according to Fig. 8, each mercury switch 156 is arranged between two successive supporting members 178, one pivot 172 of each mercury switch is electrically connected with the first feeding line, and the second pivot 172 of each mercury switch 156 is electrically connected with the other feeding line.

The contact between the pivots 172 and the bearings 180 is sufficient for assuring the electrical connection of the pivots with the feeding lines. If desired, however, this electrical connection may be improved by wires 200, the ends of which being soldered to the ends of the pivots and to a point of the supporting members.

Figure 4:
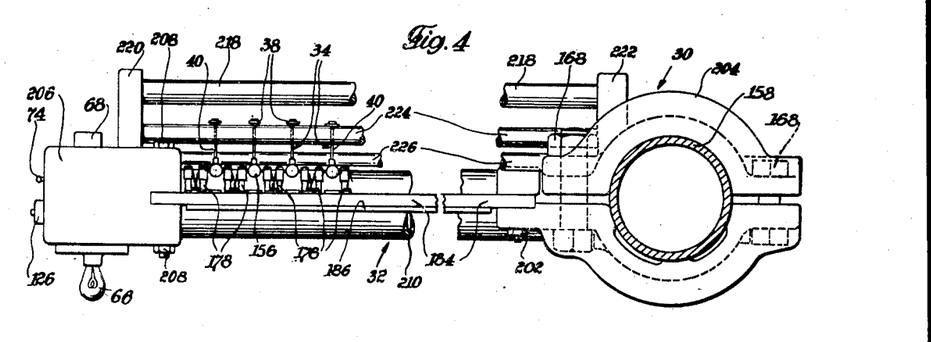

The right hand end of the non-conducting supporting bar 184, as viewed in Figs. 4 and 5, is secured by screws 202 to a hub-like two-part member 204 of the arm 32 which, in turn, is clamped on the upright 158 by means of screws 168 in an adjusted position. The left hand end of the non-conducting supporting bar 184 is connected with a member 206 by means of screws 208. Said member 206 carries a manual auxiliary stop switch 126 for stopping the warping or beaming plant, a circuit closing switch 74 for rendering operative the row of control needles 34 on the arm, and a resistor 68 electrically connected in parallel with the control lamp 66. A tubular member 210 connected with the hub-like member 204 and the member 206 by screws 212 and screws 214 respectively serves to reinforce the arm 32.

A series of eyelets 216 is arranged in suitable openings of the non-conducting supporting bar 184 to form a passage for the warp yarns 36 after their passage through the eyelets 38 of the control fingers 40.

A guiding rod 218 is arranged between an extension 220 of the member 206 and an extension 222 of the hub-like member 204. Furthermore, two limiting bars 224 and 226 are arranged between said extensions 220 and 222 parallel to said guiding rod 218.

As best shown in Fig. 6, during the normal operation of the warping or beaming plant, the warp yarns 36 travel over the surface of the guiding rod 218. The upper limiting bar 224 limits the upward movement of the control finger 40 so as to prevent an undue vibration of the control finger 40.

Upon a breakage of warp yarn the control finger 40 drops from the inactive operating position shown in Fig. 6 into the active controlling position shown in Fig. 7, wherein it is held by the lower limiting bar 226. As described above, the mercury switch 156 connected with the control finger 40 is in this position in the "on-position" for closing the circuit actuating the stop motion of the warping or beaming plant.

In the embodiment shown in Figs. 4–10, the control needles 34 comprising mercury switches 156 are mounted on a frame with adjustable arms. It is understood, however, that this type of control needles with a mercury switch may also be mounted on conventional frames having stationary arms or supporting members for the control needles. On the other hand, the frame with adjustable arms may be used for the support of any other type of control needles, for example, for the support of the conventional drop wire control elements.

Figure 11:
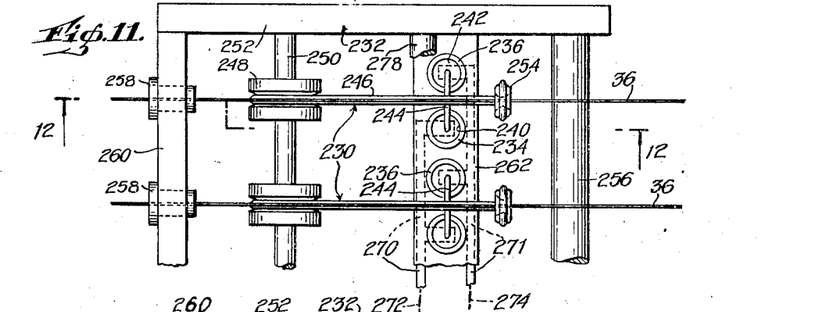
Figure 12:
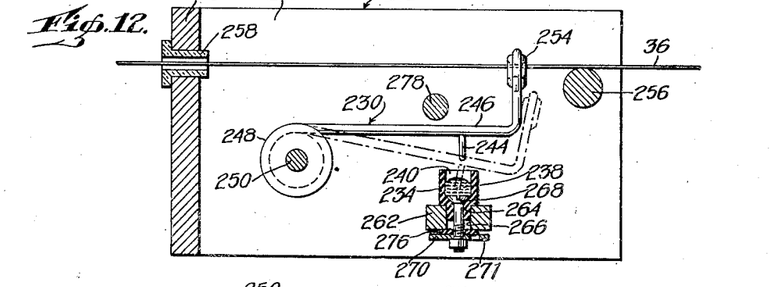

Figs. 11 and 12 illustrate a different embodiment of stop control means or control needles including a mercury switch. According to the embodiment shown in Figs. 11 and 12 the stop control means generally indicated by 230 are mounted on stationary supporting means generally indicated by 232 of a conventional frame. According to Figs. 11 and 12 each mercury switch of the row of mercury switches comprises two containers or pots 234 and 236 containing the mercury 238 and having an opening 240, 242 for the passage of the ends of the contact bridge or contact means 244 soldered to the control finger 246. One end of each control finger 246 of the row of control fingers is connected with a grooved disc 248 of insulating material rotatably and axially immovably mounted on a transverse rod 250 the ends of which are secured to the side walls 252 (only one side wall being shown) of the supporting means 232. The other end of the control finger 246 carries an eyelet 254 for engagement with a warp yarn 36. During the normal operation of the warping or beaming plant, the warp yarn 36 travelling over the guiding rod 256 and passing through the eyelet 254 of the control finger 246 and through the eyelet 258 arranged in the wall 260 of the supporting means 232 holds the control finger 246 in the inactive operating position shown in full lines in Figs. 11 and 12.

Each container 234, 236 of the mercury switch is secured to a transverse bar 262 connected with the side walls of the supporting means 232. As best shown in Fig. 12, the neck 264 of a container comprising the mercury 238 is inserted into an opening 266 of the transverse bar 262. A screw 268 passing through a bore in the neck 264 of the container holds the container in its position. Furthermore, said screw 268 is used for an electrical connection of the mercury 238 with one of the two feeding lines of the stop motion in the following manner: The mercury 238 rests on the head of the screw 268 of conducting material. The screws holding the containers 234 in their position on the transverse bar 262 are in engagement with a bus-bar 270 which, in turn, is connected with the feeding line 272 of the needle control circuit of the stop motion. The screws holding the containers 236 in their position are in engagement with a second bus-bar 271 which, in turn, is connected with the second feeding line 274 of the needle control circuit of the stop motion. Elements 276 of insulating material are arranged between the bus-bars 270, 271 and the transverse bar 262.

A limiting bar 278 is arranged at a slight distance above the row of control fingers 246 so as to prevent too great a vibration of the control fingers 246 during the warping operation.

As soon as a yarn failure occurs, for example a breakage of a warp yarn or too great a slack in a warp yarn the control finger 246 cooperating with said warp yarn drops into the active controlling position shown in dash and dot lines in Fig. 12. This swinging of the control finger 246 about the axis of the transverse bar 250 brings the ends of the contact bridge into the opening 240 and into the mercury 238 of the containers 234 and 236 whereby the needle control circuit is closed for an actuation of the stop motion.

Figure 13:
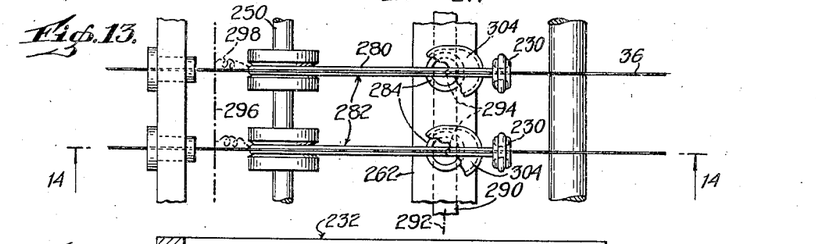
Figure 14:
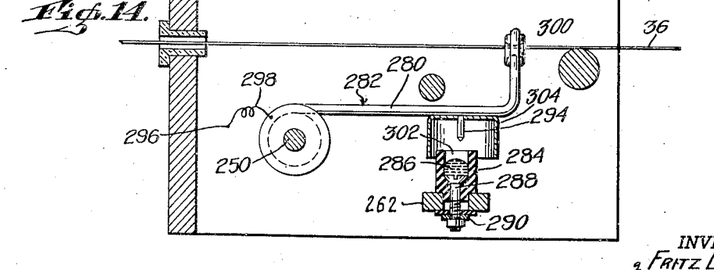

According to the embodiment shown in Figs. 13 and 14 the control finger 280 of each stop control means generally indicated by 282 is also swingably mounted on a cross bar 250 of a supporting means 232 of substantially the same construction as that shown in Figs. 11 and 12. According to Figs. 13 and 14, however, each mercury switch comprises only one container 284 containing the mercury 286. The mercury 286 is electrically connected through the screw 288 and a bus-bar 290 with the feeding line 292 of the needle control circuit of the stop motion. The contact element or contact means 294 of the mercury switch is soldered to the metallic wire forming the control finger 280 which, in turn, is connected with the other feeding line 296 of the needle control circuit of the stop motion through a wire 298 or the like.

The warp yarn 36 passing through the eyelet 300 of the control finger 280 normally holds the control finger in the inactive operating position shown in Fig. 14. Upon yarn failure, however, the control finger drops into the active controlling position by swinging about the axis of the transverse bar 250, so that the contact element 294 enters the opening 302 of the container 284 and immerses in the mercury 286 whereby the needle control circuit of the stop motion is closed for an actuation of the latter.

In the embodiment shown in Figs. 13 and 14 a protecting shield 304 is soldered to the control finger 280. Said protecting shield 304 serves to cover the opening 302 of the container 284 so as to prevent an accumulation of dust and lint on the contact element 294 or the mercury 302. In this connection it may be mentioned, that similar protecting shields may be arranged on the control fingers of the embodiment shown in Figs. 11 and 12 for covering the openings of the containers of the mercury switch.

Figure 15:
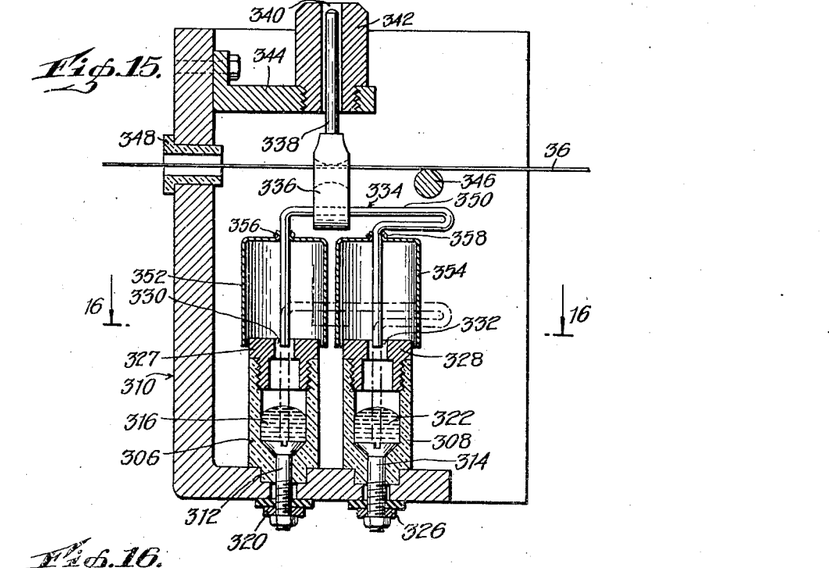
Figure 16:
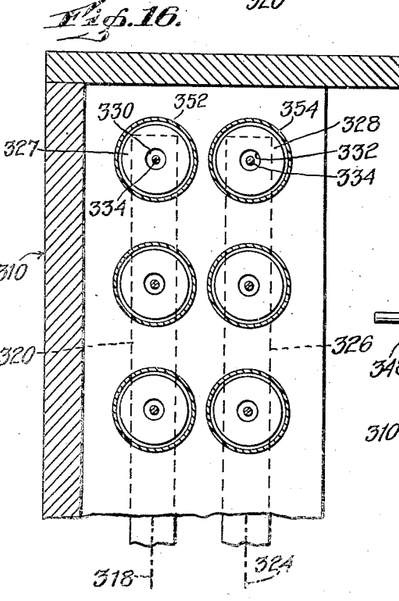
Figure 17:
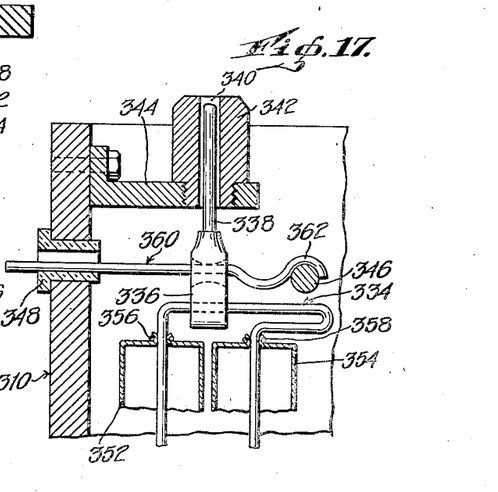

Figs. 15 to 17 illustrate still another embodiment of stop control means for an electrically operated stop motion for a warping or beaming plant according to the invention. Each mercury switch of the row of mercury switches comprises two containers or pots 306 and 308 secured to the supporting means 310 by screws 312 and 314 in the manner described above in connection with Fig. 12. The mercury 316 placed into the container 306 is electrically connected with the feeding line 318 through the screw 312 and a bus-bar 320, while the mercury 322 placed into the container 308 is electrically connected with the feeding line 324 through the screw 314 and a bus-bar 326. The containers 306 and 308 are made of insulating material; in a preferred embodiment glass or a transparent plastic is used as material for the containers. Covers 327, 328 having a small opening 330, 332 for the passage of the ends of the contact bridge or contact means 334 are screwed into the threaded end of the bore of the containers 306, 308. The contact bridge 334 is mounted on the eyelet 336 of the control finger 338 slidably arranged in a vertical bore 340 of a bushing 342 screwed in a threaded bore in the member 344 forming a part of the supporting means 310.

The warp yarn 36 travelling over the guiding rod 346 and through an eyelet 336 of the control finger and through the eyelet 348 arranged in a wall of the supporting means 310 normally holds the control finger 338 with the contact bridge 334 in the inactive operating position shown in full lines in Fig. 15.

Each control finger 338 of the row of control fingers carries a projecting element 350, which, in the embodiment shown in the drawings, is formed by a portion of the contact bridge 334. This projecting element 350 prevents an undesired great vibration of the control finger 338 during a warping operation by abutting against the guiding rod 346 arranged at a slight distance above the projecting element 350. Furthermore, this projecting element may be used as a handle for lifting the control finger into a threading position wherein the eyelet 336 of the control fingers 338 substantially registers with the eyelet 348, so that the warp yarn may be readily threaded in the control finger.

Upon yarn failure the control finger 338 drops from the inactive operating position shown in full lines in Fig. 15 into the active controlling position shown in dash and dot lines in said figure, whereby the ends of the contact bridge 334 immerse in the mercury of the containers 306, 308, so that the needle control circuit of the stop motion is closed for an actuation of the latter.

Preferably, the openings 330 and 332 have such a small diameter that any mercury, which might remain on the ends of the contact bridge, when the latter is taken out of the mercury, is removed from the ends of the contact bridge and drops into the bore of the container, so that there is no loss of mercury during the use of the stop control means. Furthermore, openings 330, 332 of small diameter prevent the passage of dust or lint into the bores of the containers 306 and 308.

According to Figs. 15 to 17 protecting shields 352 and 354 are arranged on the wire forming the contact bridge 334. Preferably said protecting shields covering the openings 330 and 332 are slidably mounted on the contact bridge and are held in their position by clamping springs 356, 358.

The construction of the stop control means shown in Figs. 15 to 17 permits the individual exchange of such a stop control means without removing other stop control means of the same row from the supporting means. If it is desired to remove a stop control means, the stop control finger 338 is lifted by means of the projecting element 350, until the latter abuts against the guiding rod 346. Then, while the control finger is held in this position, the protecting shields 352 and 354 are disengaged from the ends of the contact bridge 334 by shifting the protecting shields downward. Now, the control finger 338 may be turned about its longitudinal axis through an angle of 90°, whereupon the control finger may be lowered and disengaged from the bushing 342.

If the row of stop control means contains a larger number of stop control means than the number of warp yarns to be wound on a beam, each of the excess stop control means may be immobilized by a locking element 360 shown in Fig. 17. This locking element 360 is made of a rod having a hook 362 at one of its ends. In order to immobilize a stop control means, the rod 360 is passed through the eyelet 336 of the control finger 338 and through the eyelet 348 of the supporting means 310, and the hook-like end 362 of the rod is placed on the guiding rod 346, whereby the control finger is held in the position shown in Fig. 17. In said position the ends of the contact bridge 334 are held outside the mercury in the containers of the mercury switch, so that the immobilized stop control means cannot cause a closing of the needle control circuit of the stop motion.

In the embodiment shown in Figs. 15 to 17 each mercury switch comprises two containers with mercury similar to the mercury switch shown in Figs. 11 and 12. If desired, however, the stop control means with a slidable control finger according to Figs. 15 to 17 may be equipped with a mercury switch having only one container with mercury similar to the mercury switch shown in Figs. 13 and 14. In such a case, the slidable control finger 338 of Fig. 15 carries a contact element similar to the contact element 294 of Fig. 14, which is electrically connected with one of the two feeding lines of the stop motion, while the mercury of the container of the mercury switch is electrically connected with the other feeding line.

Figure 18:
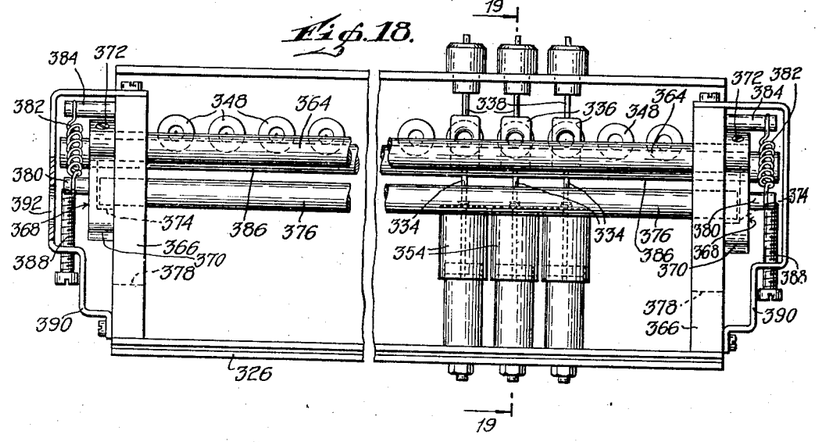
Figure 19:
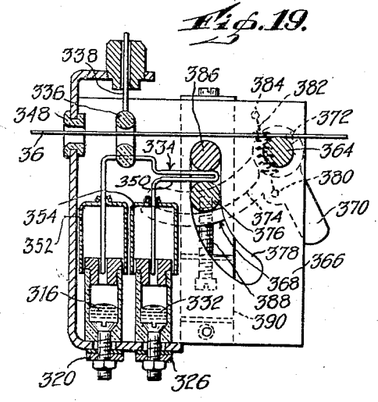
Fig. 19 a vertical sectional view of the stop control means shown in Fig. 18, taken on line 19—19 of said Fig. 18, and Fig. 20 a vertical sectional view of the stop control means shown in Fig. 18 similar to that shown in Fig. 19, wherein, however, the lifting mechanism is in an inactive position and the control needles are in an operative position.
Figure 20:
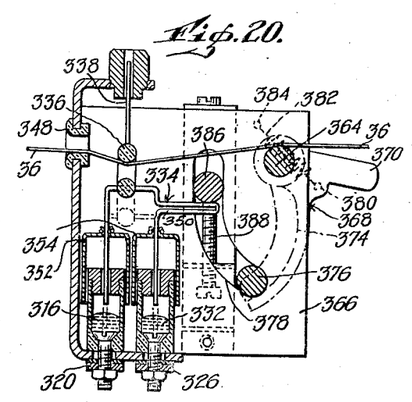

Figs. 18 to 20 illustrate the arrangement of a row of stop control means or drop needles of the type shown in Figs. 15 to 17 in supporting means equipped with a mechanism for a simultaneous lifting of all stop control means in a threading position and equipped with means for controlling the tension in the warp yarns engaged with the control fingers of the stop control means. For the sake of better illustration only three stop control means of the row of stop control means are shown in Fig. 18.

According to Figs. 18 to 20 the guiding rod 364 is rotatably mounted in the side walls 366 of the supporting means. On each end of the guiding rod 364 a lever 368 with a handle 370 is secured to the guiding rod by means of a screw 372. Each lever 368 has a recess 374 for engagement with the end of a lifting rod 376 extending below the projecting elements 350 of the stop control means and passing through slots 378 in the side walls of the supporting means. Each lever 368 carries a pin 380 connected with one end of a tension spring 382, the other end of which is connected with a stud 384 secured to the side wall 366. The spring 384 is arranged in such a manner, that it normally holds the lever 368 in the position shown in Fig. 20, wherein the lifting rod 376 engaged with the recess 374 of the lever 368 is out of the path of the projecting elements 350, so that the lifting rod does not interfere with the operation of the stop control means during a warping operation.

If it is desired to bring the stop control means into the threading position, the lever 368 is swung in clockwise direction from the position shown in Fig. 20 into the position shown in Fig. 19. During this swinging movement of the lever 368 the lifting rod 376 comes in engagement with the projecting elements 350 of all stop control means and lifts same into the threading position shown in Figs. 18 and 19. The spring 382 arranged for acting in the manner of a toggle mechanism holds the lever 368 and the lifting rod 376 in the position shown in Figs. 18 and 19, so that now the warp yarns may be readily threaded in the stop control means. It is unnecessary to use a conventional threading hook for the threading of the warp yarns, as the eyelet 336 of the control finger 338 is very close to the eyelet 348 of the supporting means.

As mentioned above, the supporting means shown in Figs. 18 to 20 is also equipped with means for controlling the tension in the warp yarns. For this purpose a tensioning rod 386 having its ends in engagement with the guiding slots 378 in the side walls 366 rests loosely on the projecting elements 350 of the stop control means. Obviously, the lifting rod 376 of the lifting mechanism lifts the tensioning rod 386 simultaneously with the stop control means into the position shown in Figs. 18 and 19. When, after the threading operation, the lever 368 of the lifting mechanism is brought into the position shown in Fig. 20, the tensioning rod 386 is free to act on the projecting elements 350 for subjecting the control fingers 338 to a load. Consequently, the warp yarn 36 engaged with the eyelet 336 of the control finger 338 is kinked by the load of the tensioning rod 386 between the eyelet 348 of the supporting means and the eyelet 336 of the control finger. Obviously, the greater the kinking of the yarn 36, the greater the tension in the yarn. Therefore, the tensioning rod 386 may be used for a control of the tension in the yarn. For this purpose, on each side of the supporting means adjustable positioning means or adjusting screws 388 are screwed into threaded bores of members 390 secured to the side walls 366 of the supporting means. Said adjusting screws are in the path of the ends of the tensioning rod 386, so that they may be used for limiting the extreme lower position of the tensioning rod. The extreme lower position of the tensioning rod is determined by the engagement of its ends with said adjusting screws 388. The farther down said extreme lower position of the tensioning rod, the greater the degree of kinking of the warp yarn, and the greater the tension in the warp yarn.

If it is desired to exchange one or the other of the stop control means, the adjusting screws 388 are brought into such a position, that they permit the removal of the tensioning rod 386 through an opening 392 in the member 390.

As will be apparent from above description, for the threading of the warp yarns in the stop control means, the stop control means are brought into the position shown in Figs. 18 and 19. Upon movement of the lifting mechanism 368, 370, 376 into the inactive position shown in Fig. 20, the control fingers 338 come into the inactive operating position shown in full lines in said Fig. 20. Said inactive operating position of the control fingers is determined by the engagement of the tensioning rod 386 with the adjusting screws 388. In said inactive operating position of the control fingers the ends of the contact bridge 334 are still out of the mercury 316, 322. Upon yarn failure, however, the control finger 338 drops into the active controlling position shown in dash and dot lines in said Fig. 20, so that the ends of the contact bridge 334 immerse in the mercury 316, 322, whereby the needle control circuit of the stop motion is closed through the mercury and the bus-bars 320, 326 for an actuation of the stop motion.

We have described preferred embodiments of our invention, but it is clear that numerous changes and omissions may be made without departing from the spirit of our invention. For example, the stop control means comprising mercury switches of the type shown in Figs. 11 to 20 may be arranged on frames with swingable and adjustable arms instead of frames with stationary supporting means shown in said figures.

What we claim is:

1. Stop control means for an electrically operated stop motion for a warping or beaming plant comprising: supporting means, a row of mercury switches, each mercury switch including contact means and at least one container comprising mercury, each mercury switch being arranged for electrical connection with the stop motion, a row of control fingers, each control finger being movably mounted on said supporting means and carrying a contact means of a mercury switch, each of said containers being secured to said supporting means and having an opening for the passage of a contact means, each of said control fingers being arranged to be engaged by a warp yarn and to be held thereby in an inactive operating position with the contact means outside the mercury, a projecting element carried by each of said control fingers, and a lifting mechanism arranged on the supporting means, said lifting mechanism being normally out of the path of said projecting elements of the control fingers and being capable of being brought into engagement with said projecting elements for a simultaneous lifting of said control fingers into a threading position, each of said control fingers being arranged for dropping into an active controlling position upon yarn failure so as to bring the contact means into said mercury for an actuation of the stop motion.

2. Stop control means as claimed in claim 1, said lifting mechanism comprising levers swingably mounted on said supporting means, and a lifting rod carried by said levers and extending below the row of projecting elements on the control fingers.

3. Stop control means as claimed in claim 1, said lifting mechanism comprising levers swingably mounted on said supporting means, a lifting rod carried by said levers and extending below the row of projecting elements on the control fingers, and a toggle mechanism associated with said levers for locking same in a position with the lifting rod holding the control fingers in threading position and for locking same in a position with the lifting rod out of the path of the projecting elements.

4. Stop control means for an electrically operated stop motion for a warping or beaming plant comprising: supporting means, a row of mercury switches, each mercury switch including contact means and at least one container comprising mercury, each mercury switch being arranged for electrical connection with the stop motion, a row of control fingers, each control finger being movably mounted on said supporting means and carrying a contact means of a mercury switch, each of said containers being secured to said supporting means and having an opening for the passage of a contact means, each of said control fingers being arranged to be engaged by a warp yarn and to be held thereby in an inactive operating position with the contact means outside the mercury, a projecting element carried by each of said control fingers, a tensioning rod loosely resting on the projecting elements of the row of control fingers for controlling the tension in the warp yarns, and adjustable positioning means for limiting the extreme lower position of the tensioning rod, each of said control fingers being arranged for dropping into an active controlling position upon yarn failure so as to bring the contact means into said mercury for an actuation of the stop motion.

5. Stop control means as claimed in claim 1, said lifting mechanism comprising levers swingably mounted on said supporting means, a lifting rod carried by said levers and extending below the row of projecting elements on the control fingers, and locking means for holding the levers in a position with the lifting rod holding the control fingers in threading position.

6. Stop control means for an electrically operated stop motion for a warping or beaming plant comprising: supporting means, a mercury switch including contact means and at least one container comprising mercury, said mercury switch being arranged for electrical connection with the stop motion, a control finger movably mounted on said supporting means, said control finger carrying said contact means, said container being secured to said supporting means and having an opening for the passage of said contact means, and at least one protecting shield carried by said control finger for covering the opening of said container, said control finger being arranged to be engaged by warp yarn and to be held thereby in an inactive operating position with the contact means outside the mercury, and said control finger being arranged for dropping into an active controlling position upon yarn failure so as to bring said contact means into said mercury for an actuation of the stop motion.

7. Stop control means for an electrically operated stop motion for a warping or beaming plant comprising: supporting means, a row of drop needles movably mounted on said supporting means for the opening and closing of the electrical circuit of the stop motion, each drop needle being arranged to be engaged by a warp yarn and to be held thereby in an inactive operating position wherein it opens the electrical circuit, and each drop needle being arranged for dropping into an active controlling position upon yarn failure wherein it closes the electrical circuit, and a lifting mechanism arranged on said supporting means, said lifting mechanism being normally out of the path of said drop needles and being capable of being brought into engagement with said drop needles for a simultaneous lifting thereof into a threading position.

8. In combination with stop control means as claimed in claim 7, locking means associated with said lifting mechanism for holding same in the position lifting the drop needles into the threading position.

9. In combination with stop control means as claimed in claim 7, locking means associated with said lifting mechanism for holding same out of the path of the drop needles.

10. In combination with stop control means as claimed in claim 7, a toggle mechanism associated with said lifting mechanism for locking same in a position holding the drop needles in the threading position and for locking same in a position out of the path of the drop needles.

11. In combination with stop control means as claimed in claim 7, a projecting element arranged on each drop needle, and a lifting rod carried by said lifting mechanism, said lifting rod extending along the row of drop needles and being capable of engagement with the projecting elements on said drop needles.

12. Stop control means for an electrically operated stop motion for a warping or beaming plant comprising: supporting means, a row of drop needles movably mounted on said supporting means for the opening and closing of the electrical circuit of the stop motion, each drop needle being arranged to be engaged by a warp yarn and to be held thereby in an inactive operating position wherein it opens the electrical circuit, and each drop needle being arranged for dropping into an active controlling position upon yarn failure wherein it closes the electrical circuit, a projecting element arranged on each drop needle, a tensioning rod loosely resting on said projecting elements of the row of drop needles for controlling the tension in the warp yarns, and adjustable positioning means for limiting the extreme lower position of said tensioning rod.

13. Stop control means for an electrically operated stop motion for a warping or beaming plant comprising: supporting means, a row of drop needles movably mounted on said supporting means for the opening and closing of the electrical circuit of the stop motion, each drop needle including a yarn engaging portion and being arranged for engagement of its yarn engaging portion by a warp yarn and to be held thereby in an inactive operating position wherein it opens the electrical circuit, and each drop needle being arranged for dropping into an active controlling position upon yarn failure wherein it closes the electrical circuit, a guiding rod secured to said supporting means for guiding the warp yarns travelling to said yarn engaging portions of the drop needles, a row of eyelets arranged in said supporting means for the passage of the warp yarns coming from said yarn engaging portions of the drop needles, and at least one locking element capable of being engaged with said guiding rod a yarn engaging portion of a drop needle and an eyelet in the supporting means for immobilizing any of said drop needles not to be used in an inactive operating position.

14. Stop control means for an electrically operated stop motion for a warping or beaming plant comprising: supporting means, a mercury switch including a contact bridge and two containers comprising mercury, said mercury switch being arranged for electrical connection with the stop motion, each of said containers being secured to said supporting means and having an opening for the passage of the ends of said contact bridge, a control finger connected with said contact bridge for carrying same, and a guide mounted on said supporting means above said containers, said guide having an aperture, a portion of said control finger being movably engaged with said aperture, said control finger being arranged to be engaged by warp yarn and to be held thereby in an inactive operating position with the ends of the contact bridge outside the mercury, and said control finger being arranged for dropping into an active controlling position upon yarn failure so as to bring the ends of said contact bridge into said mercury for an actuation of the stop motion.

15. In stop control means as claimed in claim 14, said control finger including an eyelet arranged for engagement with warp yarn.

16. Stop control means for an electrically operated stop motion for a warping or beaming plant comprising: supporting means, a mercury switch including a contact bridge and two containers comprising mercury, said mercury switch being arranged for electrical connection with the stop motion, each of said containers being secured to said supporting means and having an opening for the passage of the ends of said contact bridge, a control finger movably mounted on said supporting means, said control finger carrying said contact bridge, and stopping means arranged on the supporting means for abutting cooperation with the unit including the control finger and the contact bridge so as to limit the uppermost position thereof, said control finger being arranged to be engaged by warp yarn and to be held thereby in an inactive operating position with the ends of the contact bridge outside the mercury, and said control finger being arranged for dropping into an active controlling position upon yarn failure so as to bring the ends of said contact bridge into said mercury for an actuation of the stop motion.

17. Stop control means for an electrically operated stop motion for a warping or beaming plant comprising: supporting means, a mercury switch including a contact bridge and two containers comprising mercury, said mercury switch being arranged for electrical connection with the stop motion, each of said containers being secured to said supporting means and having an opening for the passage of the ends of said contact bridge, said two containers being arranged next to each other in line with the direction of travel of warp yarn, and a control finger movably mounted on said supporting means, said control finger carrying said contact bridge, said control finger being arranged to be engaged by warp yarn and to be held thereby in an inactive operating position with the ends of the contact bridge outside the mercury, and said control finger being arranged for dropping into an active controlling position upon yarn failure so as to bring the ends of said contact bridge into said mercury for an actuation of the stop motion.

18. Stop control means for an electrically operated stop motion for a warping or beaming plant comprising: supporting means, a mercury switch including a contact bridge and two containers comprising mercury, said mercury switch being arranged for electrical connection with the stop motion, each of said containers being secured to said supporting means and having a threaded upper end, a cover screwed on said threaded end of each container, each cover having an opening for the passage of the ends of said contact bridge, and a control finger movably mounted on said supporting means, said control finger carrying said contact bridge, said control finger being arranged to be engaged by warp yarn and to be held thereby in an inactive operating position with the end of the contact bridge outside the mercury, and said control finger being arranged for dropping into an active controlling position upon yarn failure so as to bring the ends of said contact bridge into said mercury for an actuation of the stop motion.

19. Stop control means for an electrically operated stop motion for a warping or beaming plant comprising: supporting means, a mercury switch including a contact bridge and two containers comprising mercury, fastening means of electrically conducting material passing from the interior of each container through the wall thereof and securing same to said supporting means, the mercury in each container contacting said fastening means, said fastening means being arranged for electrical connection with the stop motion, each of said containers having an opening for the passage of the ends of said contact bridge, and a control finger movably mounted on said supporting means, said control finger carrying said contact bridge, said control finger being arranged to be engaged by warp yarn and to be held thereby in an inactive operating position with the ends of the contact bridge outside the mercury, and said control finger being arranged for dropping into an active controlling position upon yarn failure so as to bring the ends of said contact bridge into said mercury for an actuation of the stop motion.

20. In stop control means as claimed in claim 19, said containers being made of an insulating material.

21. In stop control means as claimed in claim 19, said containers being made of a transparent material.

FRITZ LAMBACH.
WALTER SIEGEL.